US008511423B2

(12) United States Patent
Cheng et al.

(10) Patent No.: US 8,511,423 B2
(45) Date of Patent: Aug. 20, 2013

(54) ACOUSTIC DIODE

(75) Inventors: Jian-Chun Cheng, Nanjing (CN); Bin Liang, Nanjing (CN); Juan Tu, Nanjing (CN); Xia-Sheng Guo, Nanjing (CN); Dong Zhang, Nanjing (CN)

(73) Assignees: AAC Acoustic Technologies (Shenzhen) Co., Ltd., Shenzhen (CN); American Audio Components Inc., La Verne, CA (US)

( * ) Notice: Subject to any disclaimer, the term of this patent is extended or adjusted under 35 U.S.C. 154(b) by 258 days.

(21) Appl. No.: 13/190,586

(22) Filed: Jul. 26, 2011

(65) Prior Publication Data

US 2012/0186904 A1 Jul. 26, 2012

(30) Foreign Application Priority Data

Jan. 26, 2011 (CN) .......................... 2011 1 0028240

(51) Int. Cl.
*G01K 11/00* (2006.01)

(52) U.S. Cl.
USPC .......................................................... 181/175

(58) Field of Classification Search
USPC .......................................................... 181/175
See application file for complete search history.

(56) References Cited

U.S. PATENT DOCUMENTS

| | | | | |
|---|---|---|---|---|
| 8,132,643 | B2 * | 3/2012 | Berker et al. | 181/210 |
| 2010/0288580 | A1 * | 11/2010 | Berker et al. | 181/210 |
| 2012/0090916 | A1 * | 4/2012 | Berker et al. | 181/292 |
| 2013/0025961 | A1 * | 1/2013 | Koh et al. | 181/207 |
| 2013/0112496 | A1 * | 5/2013 | Neogi et al. | 181/175 |

* cited by examiner

*Primary Examiner* — Forrest M Phillips
(74) *Attorney, Agent, or Firm* — Anova Law Group, PLLC

(57) ABSTRACT

An acoustic diode includes a phononic crystal medium, a nonlinear acoustic medium, a aluminum tubes contain the phononic crystal medium and the nonlinear acoustic medium. The phononic crystal medium is fabricated by alternately laminating a water layers and a glass layers in a periodic manner.

6 Claims, 1 Drawing Sheet

ACOUSTIC DIODE

FIELD OF THE INVENTION

The disclosure relates to acoustic rectifier system devices, and more particularly to an acoustic diode for sound waves.

RELATED ART OF THE INVENTION

Diodes act as one-way filters for electric current, protecting delicate devices from sudden reversals in flow. The diode allows electric current to flow in only one direction in a wire and is essential in electronics, but no such one-way device exists for sound waves. Usually, sound waves can also travel easily in both directions along a given path, like electricity does, so acoustic devices could block wrong-way reflections. Alas, a acoustic diodes does not yet exist.

Therefore, it is desirable to provide an acoustic diode, that passes some sound energy in only one direction.

BRIEF DESCRIPTION OF THE DRAWINGS

Many aspects of the embodiment can be better understood with reference to the following drawings. The components in the drawings are not necessarily drawn to scale, the emphasis instead being placed upon clearly illustrating the principles of the embodiments.

DETAILED DESCRIPTION OF THE EXEMPLARY EMBODIMENT

Reference will now be made to describe the exemplary embodiment of the present disclosure in detail.

Figure 1:
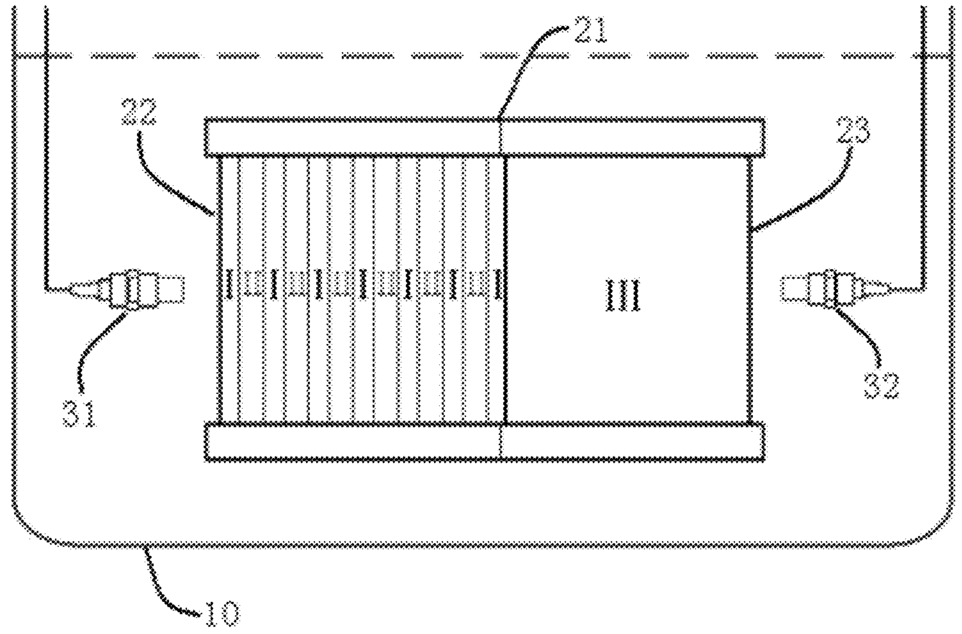
FIG. 1 is schematic of an acoustic diode structure in accordance with an exemplary embodiment of the present invention.

Referring to FIG. 1, an acoustic diode consists of two segments, the left and right parts of the sample refer to a phononic crystal medium 22 and a nonlinear acoustic medium 23, respectively. The phononic crystal medium 22 is fabricated by alternately laminating six water layers I and six glass layers II in a periodic manner. A aluminum tubes 21 contains the phononic crystal medium 22 and the nonlinear acoustic medium 23. Two broadband transducers 31, 32 are used for measuring the acoustic diode, one as a transmitter 31 and the other as a receiver 32. The measurements are conducted within a water tank 10. It acts as an effective acoustic filter, because its bandgap prevents acoustic waves with frequencies within this bandgap from being transmitted through the structure. The frequency range of the bandgap can be altered by adjusting the elastic constant, mass density and layer thickness of the constituents, water and glass in the present embodiment.

The other essential part in the acoustic diode is nonlinear acoustic medium 23. In this embodiment, the nonlinear acoustic medium 23 is a layer of ultrasound contrast agent microbubble suspension. The ultrasound contrast agent is the gel that is widely used in ultrasound radiography to enhance the imaging quality of ultrasonic diagnostics. When an acoustic wave of a certain frequency passes through the ultrasound contrast agent microbubble suspension, it will be partially converted into a second wave of twice or another integer multiple of the original frequency.

FIG. 1 schematically describes the configuration of the acoustic diode structure. The phononic crystal medium 22 is formed by alternately laminating two media in a periodic manner. Media I and II are chosen as water and glass, respectively, and their thicknesses are defined as $d_I$ and $d_{II}$. In practice, the phononic crystal medium 22 sample is fabricated by inserting six identical round glass layers (1.4 mm thickness) with a spatial interval of 1.2 mm in a cylindrical aluminum tube filled with water, which corresponded to the following parameter setting: $d_I$=1.2 mm, $d_{II}$=1.4 mm, and the total period number of the water layers and the glass layers is 6. The radii of the glass layers and the tube's inner radius are both 50 mm, in which the propagating acoustic waves could be regarded as plane waves. The ultrasound contrast agent is diluted using phosphate buffered saline, then sealed with polyethylene films in another 30-mm-long aluminum tube, with an inner radius that is also 50 mm. By coupling the resulting the phononic crystal medium 22 and the nonlinear acoustic medium 23 samples, a practical acoustic diode device is eventually constructed. In general, the acoustic diode's 'positive' and 'negative' directions are defined as the propagation directions of acoustic waves incident from the sides of the phononic crystal medium 22 and the nonlinear acoustic medium 23, respectively.

The invention is conducted in a water tank 10 that should be large enough to neglect the reflection from its walls. For each measurement, two broadband ultrasonic transducers 31, 32 are used. Two series of studies are carried out to measure the frequency dependencies of acoustic transmissions for the phononic crystal medium 22 and the acoustic diode. In one series, owing to the bandwidth limitations, two pairs of ultrasonic transducers are used to fully cover the interested frequency range from 0.5 to 2.3 MHz. One pair worked at 1-MHz central frequency and 1.1-MHz bandwidth, and the other pair work at 2.25-MHz central frequency and 2.5-MHz bandwidth. In other series, a 1-MHz transducer is used as a transmitter, and the receiver work at 2.25-MHz central frequency. The driving electronics consist of a waveform generator and a radiofrequency power amplifier. The waveform generator can provide sinusoidal driving pulses, which are then amplified with a fixed gain of 50 dB and used to drive the transmitter. Unless otherwise stated, the incident acoustic pressure is kept at 5 kPa, sufficiently small for neglecting the acoustic nonlinearity of media I and II. The transmitted waves are detected by the receiver before being digitized by an oscilloscope. The oscilloscope is triggered synchronously with the driving pulses, and the detected waveforms are stored in a PC using the GPIB interface for post-processing. The acquired signals are averaged for every 16 consecutive pulses to improve the signal-to-noise ratio.

Figure 2:
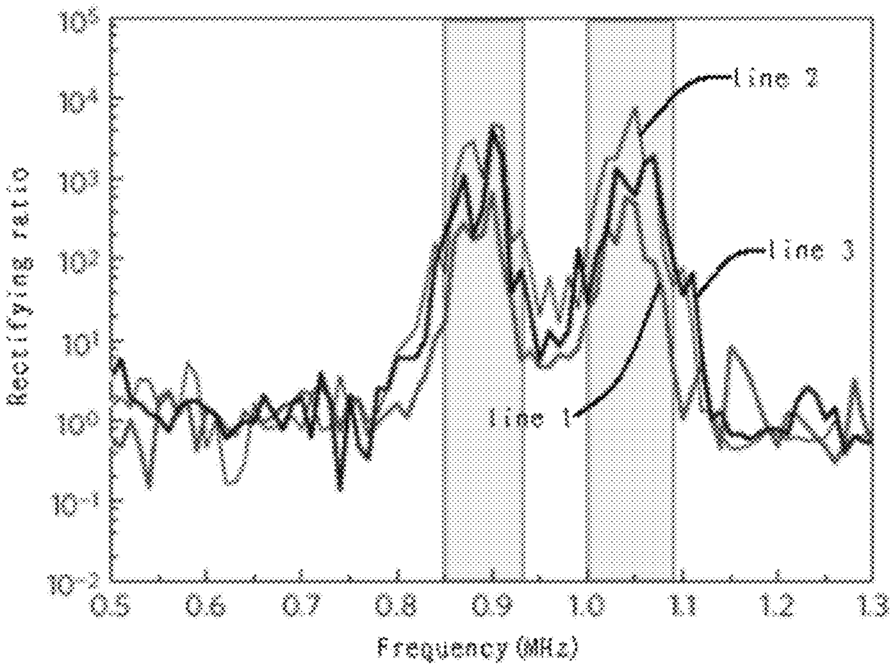
FIG. 2 is an illustration showing comparison of the rectifying ratios for the acoustic diode formed with three different ultrasound contrast agent microbubble suspension samples.

Referring to FIG. 2, results for the nonlinear acoustic medium samples produced using SonoVue microbubble suspensions with volume concentrations of ~0.025% (line 1), 0.05% (line 2) or 0.1% (line 3), which are produced using SonoVue microbubble suspensions with different volume concentrations of ~0.025%, 0.05%, or 0.1%, respectively. Significant differences between the acoustic transmissions along two opposite directions can be observed within the ERBs (grey regions) for all of the measurements. This may be reasonably interpreted as the important phenomenon of acoustic rectification. Outside the ERBs, the transmissions along the positive and the negative directions are almost identical as expected, except for slight discrepancies resulting from the measurement errors. In fact, relatively low ultrasound contrast agent microbubble suspension volume concentrations are adopted for all of the phononic crystal medium 22 samples so that the reflection resulting from the acoustic impedance mismatch between the water and the adjacent phononic crystal medium is kept at a low level, which could improve the acoustic rectification efficiency.

An acoustic wave coming in from the right-hand side goes through the nonlinear acoustic medium 23 first, which creates the overtones, as shown in FIG. 1. Although the wave with the original frequency lies within the bandgap of the phononic crystal medium 22 and will be reflected, the second harmonic, at twice that frequency, will pass freely through the phononic crystal medium 22. However, an acoustic wave arriving from the left-hand side will be totally reflected because only the original frequency is present, and this lies within the bandgap of the phononic crystal medium 22.

The invention of the electronic diode and related devices such as the transistor has revolutionized our daily lives. There are good reasons to believe that the acoustic diode might have a similarly significant effect, given that ultrasound has been used widely in biomedical imaging and nondestructive diagnostics. Even when it comes to our daily exposure to noise, the acoustic diode that acts as a noise barrier could lead to a quieter life.

While the present invention has been described with reference to a specific embodiment, the description of the invention is illustrative and is not to be construed as limiting the invention. Various of modifications to the present invention can be made to the exemplary embodiment by those skilled in the art without departing from the true spirit and scope of the invention as defined by the appended claims.

What is claimed is:

1. An acoustic diode comprising:

a phononic crystal medium;

a nonlinear acoustic medium;

a aluminum tubes containing the phononic crystal medium and a nonlinear acoustic medium;

the phononic crystal medium being fabricated by alternately laminating a water layers and a glass layers in a periodic manner.

2. The acoustic diode as described in claim 1, wherein the nonlinear acoustic medium defines a layer of ultrasound contrast agent microbubble suspension.

3. The acoustic diode as described in claim 1, wherein the phononic crystal medium is fabricated by alternately laminating six water layers and six glass layers in a periodic manner.

4. The acoustic diode as described in claim 1, wherein the thickness of the glass layers is 1.4 mm, and the thickness of the water layers is 1.2 mm.

5. The acoustic diode as described in claim 1, wherein the radii of the glass layers and the tube's inner radius are both 50 mm.

6. The acoustic diode as described in claim 2, wherein the ultrasound contrast agent microbubble suspension diluted using phosphate buffered saline, and sealed with polyethylene films in a 30-mm-long aluminum tube.

* * * * *